United States Patent [19]
Hennessy et al.

[11] Patent Number: 5,991,376
[45] Date of Patent: *Nov. 23, 1999

[54] SUBSCRIBER REWARD METHOD

[75] Inventors: Linda Hennessy, Madison; Steve L. Safran, Whitehouse Station, both of N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,936

[22] Filed: May 20, 1997

[51] Int. Cl.$^6$ .................................................. H04M 15/00
[52] U.S. Cl. ...................... 379/114; 379/93.11; 379/111; 379/121; 379/125
[58] Field of Search ................................. 379/111, 112, 379/113, 114–115, 121, 124, 126, 130, 133–134, 139, 140, 143–144, 93.13, 127, 125

[56] References Cited

U.S. PATENT DOCUMENTS

| | | | |
|---|---|---|---|
| 5,504,808 | 4/1996 | Hamrick, Jr. | 379/144 |
| 5,608,785 | 3/1997 | Kasday | 379/90 |
| 5,639,088 | 6/1997 | Schneider et al. | 237/138.2 |
| 5,675,636 | 10/1997 | Gray | 379/114 |
| 5,729,693 | 3/1998 | Holda-Fleck | 379/93.12 |
| 5,734,838 | 3/1998 | Robinson et al. | 395/214 |

*Primary Examiner*—Curtis A. Kuntz
*Assistant Examiner*—Binh K. Tieu
*Attorney, Agent, or Firm*—Robert B. Levy

[57] ABSTRACT

A subscriber (12) of a communications carrier is rewarded upon meeting certain criterion. Upon receipt of the subscriber's call, the carrier accesses a profile for the subscriber indicative of the subscriber's relationship with the carrier. Based on the information in the profile, as well as any external criterion the carrier may impose, the carrier determines whether the subscriber is eligible for a reward, and if so, then provides an announcement of the reward during the call. The carrier then provides the reward, which may be a reward of communications of service.

22 Claims, 1 Drawing Sheet

SUBSCRIBER REWARD METHOD

TECHNICAL FIELD

This invention relates to a technique for providing an instantaneous reward to a communications subscriber.

BACKGROUND ART

Today, communications service, and especially, inter-exchange communications service, has become intensely competitive. In the past only a single carrier provided inter-exchange service, but now there are many inter-exchange carriers, all competing for the same subscribers. To increase market share, many inter-exchange carriers provide various incentives, including service discounts and outright cash payments. Unfortunately, such incentive programs are expensive, and often lead to "churning" whereby some subscribers enroll with an inter-exchange carrier to take advantage of an incentive, and then switch to another carrier to enjoy the incentive offered by that carrier.

Given the high cost of acquiring new subscribers, it is generally cheaper to retain existing subscribers. To that end, inter-exchange carriers maintain and advertise different loyalty programs in an effort to reward loyal subscribers. Advertising, particularly on television, and in print, is expensive, and it is often difficult to maintain an ongoing campaign for a long period of time because of funding constraints and changing priorities. Direct mail advertising is also expensive and often may not yield high subscriber awareness of a particular loyalty program.

Present-day loyalty programs also suffer the disadvantage of requiring that the subscriber respond in a particular manner to obtain the reward. For example, some programs require that the subscriber make arrangements with their inter-exchange carrier in advance via mail or phone before the subscriber may enjoy the reward. To enable their subscribers to take advantage of various reward programs, the inter-exchange carriers must provide the necessary support personnel to manage and maintain such programs, increasing overall costs.

Moreover, some subscribers, for what ever reason, fail to redeem the loyalty reward issued by their inter-exchange carrier, especially if the subscriber perceives the redemption process as being onerous. While the carrier may derive a financial benefit if subscribers fail to redeem their loyalty reward, subscribers who do not redeem will not associate any benefit in remaining loyal to the carrier that offered the reward. If subscribers fail to redeem their loyalty reward, the inter-exchange carrier providing the rewards may not achieve its goal of retaining such subscribers.

Another problem with many inter-exchange carrier reward programs is that such programs fail to provide the subscriber with instant gratification. For example, a reward program that offers subscribers a discount at various merchants provides no immediate gratification unless the subscribers intend to purchase something from an eligible merchant at that very instant. It is far more likely that a subscriber receiving a discount coupon for merchandise will likely store the coupon, and after a brief interval, may even forget about its existence.

Inter-exchange communications carriers may not be the only type of communications carrier that may be required to offer a reward program. As local service communications carriers begin to compete among themselves for subscribers, such carriers may also be forced to institute reward programs. Similarly, INTERNET service providers may also be forced to institute reward programs.

Thus, there is a need for a reward technique for subscribers of a communications carrier that requires substantially little effort on the part of the carrier and provides immediate gratification to the subscriber.

BRIEF SUMMARY OF THE INVENTION

Briefly, in accordance with the invention, a method is provided for rewarding loyal subscribers of a communications carrier, such as an inter-exchange carrier, local service provider, or INTERNET service provider, in a manner that provides immediate gratification. When the subscriber makes a call, the communications carrier receives the call in its network and thereafter establishes a profile for the subscriber that reflects the subscriber's relationship with the carrier. In practice, the profile may contain information indicative of the subscriber's tenure with the carrier, the subscriber's billing volume, and a record whether the subscriber received any rewards a during a past interval. Using the subscriber's profile, in part, the carrier then determines whether the subscriber is eligible to receive a reward of communications services. For example, a subscriber may be eligible for a reward if the subscriber meets the following criterion: (a) a long tenure with the carrier, (b) an average bill above a pre-determined threshold; and (c) no receipt of any previous rewards within a past interval, say thirty days. Additionally, although not necessarily, the carrier may impose other criterion independent of the subscriber's profile. For instance, the carrier, for marketing purposes, may only offer rewards during specific time periods to subscribers within a particular geographic region. Also, the carrier may only offer a reward for certain types of calls, say international long distance, or domestic long distance, as opposed to other types of calls Further, the carrier may readily vary the criterion for determining reward eligibility so that one or more previously imposed requirements now may not be necessary. For example, a carrier may issue a reward of communications service even if the subscriber lacks tenure with the carrier. In this way, the new subscribers can be rewarded for acquisition purposes, in addition to, or even in place of, rewarding existing customers for loyalty.

If the subscriber meets the criterion established for a reward, then the carrier alerts the subscriber of the reward via a message played during the call. For example, the carrier may chose to reward the subscriber with communications services. One way in which a carrier could offer such a reward of communication services is for the carrier to credit part or all of the cost of the subscriber's current call. Alternatively, the carrier could provide the subscriber with a credit towards the cost of the subscriber's next call. Other rewards could also be offered, in the form of merchandise or services provided to the subscriber through a fulfillment process. While such rewards aren't able to be offered immediately, in contrast to a reward of telecommunications services, such rewards would be announced in the manner described above, thereby accomplishing the advantage of immediate gratification as is also achieved by the reward of telecommunications services.

DETAILED DESCRIPTION

Figure 1:
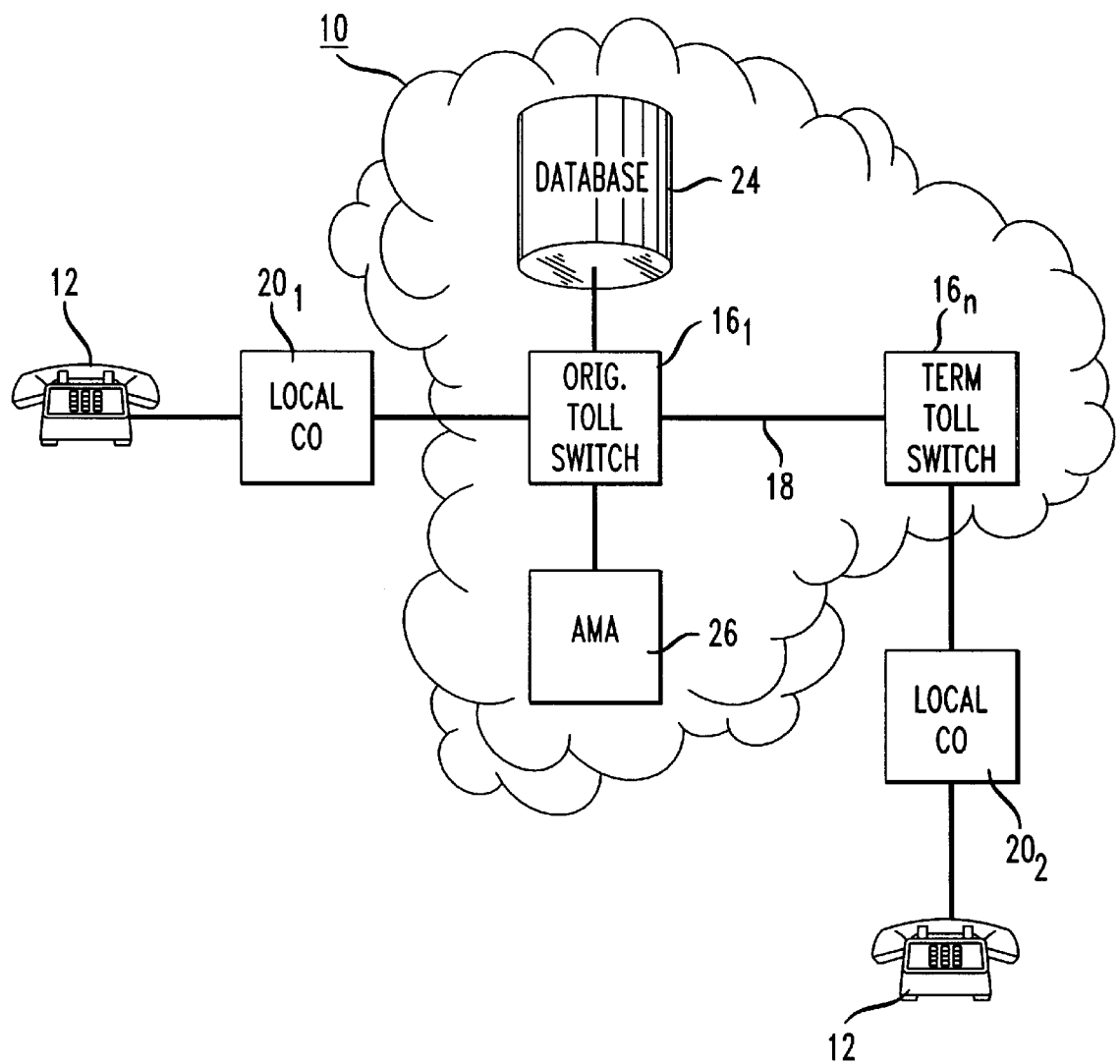
FIG. 1 illustrates a network maintained by a communications carrier capable of providing a reward of communications services to a subscriber placing a call through the network.

FIG. 1 discloses a network 10 maintained by a communications carrier for providing communications service to subscribers, represented by telephone sets 12 and 14. In the illustrated embodiment, the network 10 provides inter-exchange service, and thus, the network is typically maintained by an Inter-exchange (IXC) carrier, such as AT&T. To carry inter-exchange traffic, the network 10 includes a plurality of toll switching systems $16_1$–$16_n$ (where n is an integer), each switching system connected to at least one other switching system by at least one trunk group 18. Additionally, the network 10 also includes a Common Channel Signaling System (not shown), such as the AT&T Common Channel Signaling System 7, for communicating signaling messages between and among the toll switching systems $16_1$–$16_n$. While the illustrated network 10 depicts a single pair of toll switching systems $16_1$ and $16_n$ (designated by the terms Originating and Terminating, respectively), the network may include additional toll switching systems for carrying calls. In the preferred embodiment, each of the toll switching systems $16_1$–$16_n$ comprises a mode 4ESS switching system formerly manufactured by AT&T, although other switching systems could be used to practice the invention.

Each of the subscribers 12 and 14 receives local telephone service (i.e., dial tone) via a separate one of local central office switching systems $20_1$ and $20_2$, respectively, each typically a No. 5ESS central office switch, although other switching systems are available for this purpose. Traditionally, local service has been the province of the Local Exchange Carrier serving each subscriber, and for this reason, the central office switching systems $20_1$ and $20_2$ have not been depicted as comprising part of the IXC network 10. However, as various IXC carriers, including AT&T, provide local service to subscribers, such as the subscribers 12 and 14, one or both of the local switching systems $20_1$ and $20_2$ may be partly or wholly under the dominion and control of the IXC carrier, and under such circumstances, may be considered part of the network 10.

Assuming that the subscribers 12 and 14 reside in different Local Access Transport Areas (LATA) for telephone call handling purposes, a telephone call initiated by the subscriber 12 to telephone number associated with the subscriber 14 first passes to from the telephone set of the subscriber 12 to the local central office switching system $20_1$. Based on the dialed number, the local telephone switching system $20_1$ knows that the call is an inter-exchange call and must be routed to an inter-exchange network, such as network 10 in FIG. 1. Hence, the local telephone switching system $20_1$ hands off the call dialed to the subscriber 14 to the IXC network 10 for receipt at the toll switching system $16_1$. The toll switching system $16_1$ receiving the call is referred to as the Originating toll switching system because the call is deemed to originate therefrom with regard to the network 10.

Assuming that the Originating toll switch $16_1$ posses the requisite call processing capability, the switching system $16_1$ may consult with a data base 24, referred to in the AT&T Network as a Network Control Point (NCP) to determine what if any special handling is necessary for the call. Typically, the switching system $16_1$ queries the data base 24 via a signaling link 25 comprising part of the Common Channel Signaling System referred to previously. Thereafter, the toll switching system $16_1$ determines the destination for the call and then routes the call, either directly, or through one or more via toll switching systems (not shown) to the Terminating (destination) toll switching system $16_n$ serving the subscriber 14. The toll switching system $16_n$ routes the call to the subscriber 14, via the local switching system $20_2$. (Note that if the Originating toll switching system $16_1$ lacked the requisite call processing capability to process the incoming call, then the call would be handed off to a "hand-off" toll switching system (not shown) that would process the call (e.g., make the necessary data base inquiry) and thereafter route the call to the toll switching system $16_n$.)

Upon receipt of the call, the Originating toll switching system $16_1$ (or a hand-off switching system as discussed) keeps a billing record for the call. The billing record includes the identity (i.e., originating number), the destination number, the time when the call started and ended. Following call completion, the billing information is transferred to an Automatic Messaging Accounting (AMA) system 26. The AMA system 26 takes the billing record and establishes the cost for the call, taking into account the duration of the call, the appropriate rating (per-unit charge) together with any discount or other call billing information. The call charges established by the AMA 26 are billed to the subscriber.

In accordance with the invention, the network 10, as described, can advantageously be utilized to provide an instantaneous reward to subscribers (e.g., subscribers 12 and 14) for retention or even acquisition purposes. To facilitate rewarding subscribers (as determined from various criterion discussed below), the network 10 stores profiles of its subscribers (i.e., the subscribers pre-subscribed to the carrier) in the data base 24, or another data base (not shown) accessible to the Originating toll switching system $16_1$ (or the hand-off toll switching system). It is possible that a subscriber may not be pre-subscribed to the carrier but nonetheless utilize the carrier by dialing the carrier's access code (e.g., 10288 in the case of AT&T). For that reason, it may be desirable to maintain a profile for subscribers that are not pre-subscribed to the carrier but who nonetheless rely on the carrier for communications service.

In practice, each subscriber's profile is cross-referenced by the subscriber's telephone number. As will be discussed, when Originating switching system $16_1$ (or the hand-off switching system) receives the subscriber's call, the switching system also receives number of the telephone set at which the call originated via Automatic Number Identification (ANI) for billing purposes. From a knowledge of the subscriber's telephone number, the carrier can access the subscriber's profile, whether or not the subscriber is not pre-subscribed. To enable a subscriber making a call from a different telephone set (e.g., a pay phone) to be eligible for a reward, the carrier could prompt the subscriber to enter his/her telephone number to enable the carrier to access the profile.

Each subscriber's profile typically includes information indicative of the subscriber's tenure with the carrier, (i.e., how long the subscriber has been pre-subscribed or (PIC'd) to the carrier. Each subscriber's profile may also include summary billing information, such as a running average monthly bill, or a maximum monthly bill over a particular interval (say six months). The subscribers' profiles may include other criterion deemed important for reward purposes. For example, a subscriber's profile may include summary information regarding the type of calls ( e.g., local, domestic long distance, and international long distance) as well as their geographic destination.

Using the information in a subscriber's profile, a carrier may target subscribers that have an average monthly billing volume at or above a set amount. Alternatively, the carrier may want to offer a different reward for those subscribers having average or maximum monthly billing volume above a certain threshold as compared to the reward for subscribers having a lower billing volume. Indeed, the rewards may be tiered to different billing volumes. If desired, the subscriber billing volume could be divided into separate categories based on the type or even the destination of the call. For example, if a subscriber makes a large volume of international calls, but fewer domestic inter-exchange calls, such information would be reflected in the subscriber's profile. In this way, subscribers could be rewarded for different types of calls, or calls to a particular location.

Additionally, the subscriber profile would include information whether the subscriber had previously received a reward of communications services within a past interval, say thirty days. Typically, the carrier providing the reward will not want to provide a subscriber with too frequent a reward because of the expense. Moreover, too frequent a reward might lead the subscriber to continually expect such reward that could impair the carrier's ability to alter or even discontinue the program if necessary.

Using the subscriber profiles stored in the data base 24 (or another data base), the Originating toll switching system $16_1$ (or the hand-off toll switching system) can determine, upon receipt of the subscriber's call, whether the subscriber is eligible for a reward. The carrier will access the subscriber's profile and then compare the information to a set of pre-scribed reward criterion. For example, the carrier may require the following criterion for reward eligibility: (a) billing volume greater than 120 minutes, (b) tenure greater than six months, and (c) no receipt of a reward within the last thirty days. Obviously, these criteria can be varied, Additionally, the carrier may impose other criterion independent of the information in the subscriber profiles. For example, the carrier may only wish to offer rewards during a particular time, say evening hours, or on weekends. Moreover, the carrier may only wish to offer rewards to subscribers in a particular geographic area, or to subscriber's placing calls to particular destinations.

Indeed one or more of the criterion discussed above could be eliminated. For example, to retain loyal customers, the carrier may impose the requirement that the subscriber be pre-subscribed for a period of time (say six months). However, the carrier may choose to eliminate this requirement and utilize the reward program for acquisition of new customers, either generally, or those within a particular geographic region or which make certain types of calls.

Obviously, if the subscriber has no profile, then the subscriber will not be eligible for a reward. However, once a subscriber, particularly someone who is not pre-subscribed, utilizes the carrier for the first time, the carrier can then establish a profile for that subscriber, adding information generating during the current call. Moreover, by the same token, a carrier could choose to erase a profile for a subscriber that is inactive.

In practice, the Originating toll switching system $16_1$ (or the hand-off switching system) determines the eligibility of the subscriber 12 upon receipt of the call therefrom but prior to actually launching the call to the subscriber 14. In other words, the profile of the subscriber 12 is accessed and the information contained therein compared to the imposed criterion prior to routing the call to the Destination toll switching system $16_n$. Should the subscriber 12 be eligible, then the Originating toll switching system $16_1$ (or the hand-off switching system) plays an announcement during the call advising the subscriber of the reward. In practice, the toll switching systems $16_1$–$16_n$ each have the capability of playing various announcements and the reward announcement would simply be another of the announcements capable of being provided.

Various types of rewards could be provided to a subscriber meeting the eligibility requirement. One type of reward could be providing the eligible subscriber with telecommunications services. Such a reward may be made in several different ways. For example, the subscriber may be rewarded by making the cost of the current call free. Rather than credit the subscriber with the entire cost of the call, the carrier could reward the subscriber with a certain number of free minutes. This approach better quantifies the ultimate cost to the carrier and may stimulate the subscriber extend the length of the call, increasing potential revenues.

As an alternative to providing the subscriber with a communications service (e.g., a credit) during the current call, the carrier could reward the customer by providing a credit during the next call. Thus, upon determining that the subscriber meets the requisite criterion for a reward, the carrier could announce to the subscriber that all or a portion of the next call would be free. The disadvantage of this approach is that the subscriber will likely maximize the value of the reward by calling a distant location.

Other types of rewards could also be provided, such as free or discounted goods and/or services. Such goods would be offered via a fulfillment process. However, just like the reward of telecommunications services, the reward of such other goods would be announced during the call, providing the subscriber with instant gratification.

As discussed, determination of the subscriber eligibility and announcement of the reward upon eligibility are made prior to launching the call. Thus, the carrier could offer the reward of service to the subscriber and update the subscriber's profile to reflect the receipt eventhough the call is not completed and the subscriber isn't able to enjoy the reward. Assuming the subscriber is eligible, it may be more desirable to announce the reward upon an indication that called party (subscriber 14) has answered.

Depending on the nature of the reward made to the subscriber, the Originating toll switching system $16_1$ (or the hand-off switching system) will send the appropriate information to the AMA system 26 to assure the subscriber's billing record is adjusted appropriately. In this regard, a reward in the form of a currency credit towards the subscriber's accumulated charges could be made, rather an offer of free call, or a certain number of free minutes. all of which are deemed to be a reward of communications service in accordance with the invention. Obviously, an appropriate announcement would be made during the call to the subscriber if a credit is to be made to that subscriber's account.

The foregoing describes a technique for rewarding a loyal subscriber of a communications carrier with by announcing such a reward during the course of a call made by that subscriber through the carrier. While the reward technique of the invention has been described in the context of an IXC network, it should be appreciated that the method could easily be practiced by a provider of local telecommunications services. In this regard, each of the local switching systems $20_1$ and $20_2$ could be provided with a data base (not shown) for storing subscriber profile information to enable each switch to make a reward eligibility determination in the manner described. Similar, the reward method of the invention could also be practiced by an INTERNET service provider.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for uniformly providing rewards to communication carrier subscribers in accordance with at least a first criterion common for all subscribers that place calls with the communications carrier, comprising the steps of:

storing a profile containing information about the subscriber's relationship with the carrier;

accessing the information in the subscriber's profile upon receipt by the carrier of a call placed by the subscriber;

uniformly determining, in part, from the information contained in the subscriber's profile, whether the subscriber, upon using said communications carrier, is eligible for a reward using said first criterion common to all subscribers such that each subscriber meeting the common criterion receives the reward with other subscribers meeting the common criterion and if so, then announcing to the subscriber during the call that the subscriber is being rewarded, and providing the subscriber with the reward.

2. The method according to claim 1 wherein the first common criterion is whether the subscriber has a tenure with the carrier of a prescribed length and wherein the subscriber's profile includes information indicative of the subscriber's tenure with the carrier.

3. The method according to claim 1 wherein said first common criterion is whether the subscriber received an award within a previous period of time and wherein the subscriber's profile includes information indicative of whether the customer has received a reward within a previous time period.

4. The method according to claim 1 wherein the first common criterion is whether the subscriber has a billing volume above a prescribed value and wherein the subscriber's profile includes information indicative of the subscriber's billing volume.

5. The method according to claim 4 wherein the billing volume is a maximum billing volume value.

6. The method according to claim 4 wherein the billing volume is an average billing volume over a fixed interval.

7. The method according to claim 1 wherein a second criterion common to all subscribers is employed to determine subscriber eligibility for a reward.

8. The method according to claim 7 wherein said second common criterion is whether the subscriber received an award within a previous period of time and wherein the subscriber's profile includes information indicative of whether the customer has received a reward within a previous time period.

9. The method according to claim 8 wherein said second common criterion is whether the subscriber has a billing volume above a prescribed value and wherein the subscriber's profile includes information indicative of the subscriber's billing volume.

10. The method according to claim 9 wherein the billing volume is a maximum billing volume value.

11. The method according to claim 9 wherein the billing volume is an average billing volume over a fixed interval.

12. The method according to claim 1 wherein the subscriber is provided a reward of communications services.

13. The method according to claim 12 wherein the subscriber is rewarded with communications services by crediting the customer with all costs for a call currently made by the subscriber.

14. The method according to claim 12 wherein the subscriber is provided with the reward of communications service by crediting the customer with a portion of all costs for a call currently made by the subscriber.

15. The method according to claim 12 wherein the subscriber is provided with the reward of communications service by crediting the customer with all costs for a call subsequently made by the subscriber.

16. The method according to claim 12 wherein the subscriber is provided with the reward of communications service by crediting the customer with a portion of all costs for a call subsequently made by the subscriber.

17. The method according to claim 12 wherein the subscriber is provided with the reward of communications service by crediting the subscriber on its account a prescribed currency amount.

18. The method according to claim 12 wherein the reward of communications services is made only if the call is completed.

19. A method for uniformly providing a rewards to communications services subscribers using a common criterion that is unrelated to account information associated with each individual subscriber that places and receives calls, comprising the steps of uniformly determining from at least one first criterion common to all subscribers whether a subscriber, using said communications carrier, is eligible for a reward so that each subscriber meeting the common criterion receives the reward with other subscribers meeting the common criterion; and if so, then announcing to the subscriber during the call that the subscriber is being rewarded; and providing the subscriber with the reward.

20. The method according to claim 19 wherein the external criterion for determining subscriber eligibility includes the criterion of whether the subscriber's call occurred during a prescribed time interval.

21. The method according to claim 19 wherein the external criterion for determining subscriber eligibility includes the criterion of whether the subscriber's call originated from a particular geographic region.

22. The method according to claim 19 wherein the external criterion for determining subscriber eligibility includes the criterion of whether the subscriber's call was of a particular type.

* * * * *